US012342431B2

(12) United States Patent
Chen et al.

(10) Patent No.: US 12,342,431 B2
(45) Date of Patent: Jun. 24, 2025

(54) LED CONTROL METHOD AND SYSTEM

(71) Applicant: LEN Technology Limited, Wuxi (CN)

(72) Inventors: Jingquan Chen, San Jose, CA (US); Chen Li, Wuxi (CN)

(73) Assignee: LEN Technology Limited, Wuxi (CN)

(*) Notice: Subject to any disclaimer, the term of this patent is extended or adjusted under 35 U.S.C. 154(b) by 213 days.

(21) Appl. No.: 17/846,984

(22) Filed: Jun. 22, 2022

(65) Prior Publication Data

US 2022/0418062 A1 Dec. 29, 2022

(30) Foreign Application Priority Data

Jun. 29, 2021 (CN) ......................... 202110724644.5

(51) Int. Cl.
*H05B 45/18* (2020.01)
*H05B 45/14* (2020.01)

(52) U.S. Cl.
CPC ............. *H05B 45/18* (2020.01); *H05B 45/14* (2020.01)

(58) Field of Classification Search
CPC ......... H05B 45/18; H05B 45/14; H05B 45/56
See application file for complete search history.

(56) References Cited

U.S. PATENT DOCUMENTS 8,400,081 B2 * 3/2013 Catalano ............... F21V 23/005 315/185 S
2002/0030455 A1 * 3/2002 Ghanem ................ H05B 45/18 315/149

OTHER PUBLICATIONS

"LM2611 1.4-MHz Cuk Converter", Texas Instruments, Dec. 2015, pp. 1-29 (Year: 2015).*

* cited by examiner

*Primary Examiner* — Daniel D Chang
(74) *Attorney, Agent, or Firm* — Seed IP Law Group LLP

(57) ABSTRACT

The present application provides an LED control system, including an LED driver chip, a thermistor independent of the LED driver chip, and a matching resistor of the thermistor, wherein different thermistors correspond to different matching resistors; the LED driver chip and the matching resistor are configured to generate corresponding LED control targets according to different thermistors; wherein the upper and lower limits of the control targets are preset by the LED driver chip regardless of the thermistor; and the slope of the change of control target over the change of temperature is fitted with the slope of the change of thermistor resistance over the change of temperature, and the upper and lower limits of the control target remains the same for different choices of thermistors. The present application also provides a corresponding LED control method.

19 Claims, 4 Drawing Sheets

LED CONTROL METHOD AND SYSTEM

TECHNICAL FIELD

The present application relates to the field of electrical control, and in some implementations relates to a control method and system for LEDs.

BACKGROUND TECHNIQUE

In an LED lighting system, continuous operation of the LED causes the LED temperature to rise, which accelerates its aging and reduces its service life. In some implementations, under the general trend of increasing driving current and decreasing package size, a design that can automatically reduce the LED current when the temperature is too high is required. In this case, a thermistor, such as a thermistor with a negative temperature coefficient (NTC), is often used in the LED lighting system to control the current of the LED.

SUMMARY OF THE INVENTION

In view of the above problems, the present application provides a light emitting diode ("LED") control system, including an LED driver chip, a thermistor independent of the LED driver chip, and a matching resistor of the thermistor, wherein different thermistors correspond to different matching resistors; the LED driver chip and the matching resistor are configured to generate corresponding LED control targets according to different thermistors; wherein the upper and lower limits of the control targets are preset by the LED driver chip regardless of the thermistor; and the slope of the change of control target over the change of temperature is fitted with the slope of the change of thermistor resistance over the change of temperature, and the upper and lower limits of the control target remain the same for different choices of thermistors.

In some implementations, the LED driver chip includes a target generating unit; the matching resistors include a first matching resistor on a first branch coupled between the target generating unit and ground potential, and a second matching resistor on a second branch coupled between the target generating unit and ground potential, a second matching resistor connected in series with the thermistor; wherein the target generating unit is configured to, in cooperation with the first matching resistor, fit the slope of the change of the LED control target over temperature to the slope of the thermistor over the change of temperature. The cooperation of the two matching resistors makes the upper and lower limits of the LED control target fit with the preset upper and lower limits of the LED current or voltage.

In some implementations, the target generation unit includes a first voltage source, which is coupled to the first terminal of the LED driver chip, and the first matching resistor is coupled between the first terminal and the ground potential; a first current-controlled current source coupled to a second terminal of the chip, the thermistor and the second mating resistor coupled between the second terminal and ground, wherein the current of the current-controlled current source is controlled by the current flowing through the first matching resistor; the voltage clamping circuit configured to receive a voltage drop across the thermistor and the second matching resistor as the control target, and to clamp the control target to an upper limit when the voltage drop across the thermistor and the second matching resistor is above the upper limit, and to clamp the control voltage to a lower limit when the voltage drop across the thermistor and the second matching resistor is below the lower limit.

In some implementations, the first current-controlled current source includes a first operational amplifier whose positive input terminal is coupled to the first voltage source; a first transistor whose first terminal is coupled to the power source and whose control terminal is coupled to the output terminal of the first operational amplifier, and the second terminal of which is coupled to the first terminal of the LED driver chip and the negative input of the first operational amplifier; and a second transistor, the first terminal and the control terminal of which are respectively coupled to the first terminal and the control terminal of the first transistor, and the second terminal of which is coupled to the second terminal of the chip and the voltage clamping circuit.

In some implementations, the voltage clamping circuit includes a first clamping branch and a second clamping branch connected in parallel with each other and coupled between the second terminal of the LED driver chip and the ground potential; wherein the first clamping branch includes a first diode and a second voltage source, the anode of the first diode is coupled to the second terminal of the LED driver chip, and the cathode of the first diode is grounded through the second voltage source; the second clamping branch includes a second diode and a third voltage source, the cathode of the second diode is coupled to the second terminal of the LED driver chip, and the anode thereof is grounded through the third voltage source; wherein the second voltage source corresponds to the preset LED control target upper limit, and the third voltage source corresponds to the preset LED control target lower limit.

In some implementations, the target generating unit includes a first current source, which is coupled to a third terminal of the chip, and the third terminal is grounded through the thermistor and the second matching resistor connected in series; a voltage-controlled voltage source coupled to the fourth terminal of the chip, the fourth terminal is grounded through the first matching resistor, wherein the voltage of the first voltage-controlled voltage source is affected by the voltage drop on the thermistor and the second matching resistor; a second current-controlled current source, wherein the current of the second current-controlled current source is controlled by the current flowing through the first matching resistor; a current clamping circuit, which is coupled to the second current-control current source, and is configured to receive the current of the second current-control current source as the control target, and clamp the control target between the preset upper and lower limits of the LED current.

In some implementations, the first voltage-controlled voltage source and the second current-controlled voltage source include a second operational amplifier whose positive input terminal is coupled to the third terminal of the LED driver chip; a third transistor whose first terminal is coupled to the power supply, the control terminal is coupled to the output terminal of the second operational amplifier, the second terminal is coupled to the fourth terminal of the LED driver chip and the negative input terminal of the second operational amplifier; and a fourth transistor, the first and control terminals of which are coupled to the first and control terminals of the third transistor, respectively, and the second terminals of which are coupled to the current clamp circuit.

In some implementations, the LED driver chip further includes an LED current detection unit, configured to detect the current flowing through the LED; an LED current control unit, coupled to the LED current detection unit and the target generation unit, configured to be based on the control target and the current flowing through the LED to generate a driving indication signal; and an LED current driving unit is configured to drive the LED according to the driving indication signal.

The present application also provides an electronic device, including one or more LEDs, and any of the above-mentioned LED driving systems.

The present application provides an LED driving method, which includes selecting a matching resistor corresponding to the thermistor and the preset upper and lower limits of the LED current or voltage; using an LED driving chip and the thermistor and its matching resistance to generate the LED control target; wherein the upper and lower limits of the control target are fitted with the preset upper and lower limits of the LED current or voltage, and the change slope of the control target over temperature and the change slope of the thermistor over temperature is fitted, and the upper and lower limits of the control target are preset by the LED driver chip and are fixed for different thermistors.

DESCRIPTION OF DRAWINGS

Embodiments are shown and explained with reference to the drawings. The drawings serve to clarify the basic principles, thus showing only the aspects necessary to understand the basic principles. The drawings are not to scale. In the drawings, the same reference numbers refer to similar features.

DETAILED DESCRIPTION

Figure 1A:
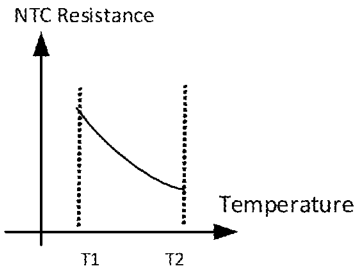
FIG. 1A shows a diagram of the thermistor value changing over temperature.

In the following detailed description of the preferred embodiments, reference will be made to the accompanying drawings which form a part hereof. The accompanying drawings show, by way of example, specific embodiments in which the application can be practiced. The exemplary embodiments are not intended to be exhaustive of all embodiments in accordance with the present application. It is to be understood that other embodiments may be utilized and structural or logical modifications may be made without departing from the scope of the present application. Therefore, the following detailed description is not intended to be limiting, and the scope of the application is defined by the appended claims.

Techniques, methods, and apparatus known to those of ordinary skill in the relevant art may not be discussed in detail, but where appropriate, such techniques, methods, and apparatus should be considered part of the specification. The lines between the units in the drawings are only for the convenience of description, which means that at least the units at both ends of the lines communicate with each other, and are not intended to limit the inability to communicate between the unconnected units.

In the following detailed description, reference may be made to the accompanying drawings, which are considered as a part of this application to illustrate specific embodiments of the application. In the figures, like reference numerals describe substantially similar components in the different figures. The specific embodiments of the present application are described in sufficient detail below to enable those of ordinary skill with relevant knowledge and technology in the art to implement the technical solutions of the present application. It should be understood that other embodiments may also be utilized or structural, logical or electrical changes may be made to the embodiments of the present application.

The following applies the convention of using the high level as the active level and the low level as the inactive level. Of course, complementary embodiments to this situation are also under the protection scope of the present application.

The transistors in the following description may be MOS transistors, the first terminal and the second terminal represent the drain electrode or the source electrode, and the control electrode represents the gate electrode. The transistors in the following description may also be bipolar transistors, with the first and second terminals representing the collector or transmitter, and the control electrode representing the base.

Figure 1B:
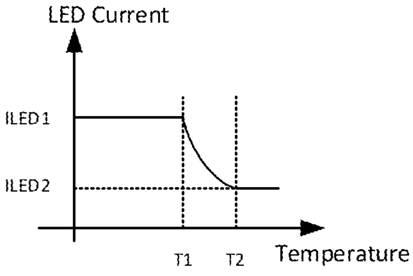
FIG. 1B shows an exemplary graph of LED current variation using thermistor to control LED current.

FIG. 1A shows a curve of the thermistor resistance value versus temperature. As shown in FIG. 1A, the resistance value of the thermistor, such as a negative temperature coefficient ("NTC") thermistor, decreases with the increase of temperature, e.g., in the temperature range of T1-T2. FIG. 1B shows a desired light emitting diode ("LED") current control over temperature using a thermistor. As shown in FIG. 1B, when the temperature is in the normal operating range, for example, when it is below T1, it is desired to keep the LED current at a fixed high level of ILED1, corresponding to a relatively high brightness; when the temperature of the LED exceeds the first threshold of T1, the thermal characteristics of the NTC are used to control the LED's current, as a result, the current decreases along with the increase of temperature. Furthermore, the corresponding LED luminous brightness also gradually decreases. When the temperature further exceeds the second temperature threshold T2, the current of the LED is kept at ILED2, which is a relatively fixed low level for maintaining sustaining illumination.

As shown herein, since users may use different types of NTC thermistors to control the working state of the LED, different temperature-dependent LED current targets should be formulated for different NTC resistors. For example, the analog-to-digital converter ("ADC") can be used to convert the sensed temperature into data input to a processing unit, e.g., a micro-controller ("MCU"), and the MCU and the firmware/software can be used to control the LED target current based on the data input representing the sensed temperature. But doing so would lead to high cost of building an LED driver system and complicated manipulation.

The present application provides technical solutions, which can accommodate different NTC resistance curves without significantly increasing the cost. The technical solutions can reduce the cost of the LED drive system while controlling the LED current with temperature changes.

According to an embodiment, the present application provides a method for controlling an LED. In the case where the user uses different thermistors to control the current or voltage of the LED over temperature, the method only replaces the matching resistor to match the thermistor, without making any changes to the LED driver chip, the LED control target can be fitted with the characteristic curve of the thermistor value over temperature, and at the same time, the LED control target can be clamped at the preset upper or lower limits to ensure normal LED lighting function.

For example, no matter how the model of the thermistor changes, the techniques ensure that the LED control target (current) satisfies the current level ILED1 shown in FIG. 1B when the temperature is lower than T1, and satisfies ILED2 shown in FIG. 1B when the temperature is higher than T2. Under the premise of adjusting the resistance value of the matching resistor with the thermistor characteristics, when the temperature is between T1 and T2, the change slope of the LED control target is fitted or basically the same as the change slope of the thermistor shown in FIG. 1A.

Figure 2:
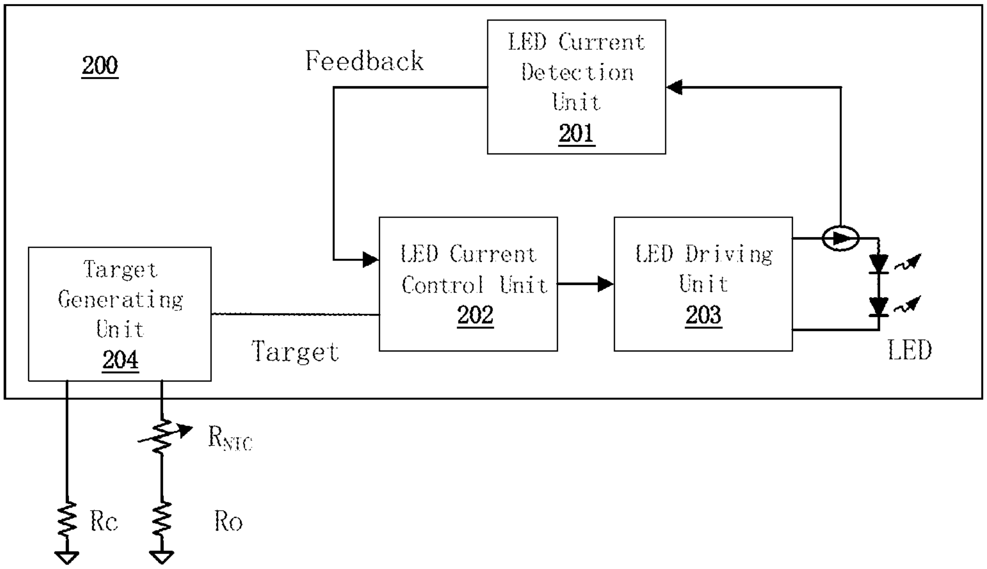
FIG. 2 is a schematic structural diagram of an LED driving system according to an embodiment of the present application.

FIG. 2 is a schematic structural diagram of an LED driving system according to an embodiment of the present application.

According to an embodiment, the system may include an LED driver chip 200 and a thermistor $R_{NTC}$ and its associated resistors Ro and Rc.

According to an embodiment, the LED driver chip 200 may include an LED current detection unit 201, an LED current control unit 202, an LED driving unit 203, and a target generating unit 204. The thermistor $R_{NTC}$ and its matching resistors Rc and Ro can be located off-chip or independent of the chip. Users can replace different types of RNTCs according to their needs, and can generate LED control targets matching the RNTC by replacing the corresponding Rc and Ro to control the current flowing through the LEDs.

According to an embodiment, the LED current detection unit 201 may detect the LED current driven by the LED driving unit 203 and feedback the detection result to the LED current control unit 202.

According to an embodiment, the target generating unit 204 is coupled to the ground through the first matching resistor Rc; the target generating unit 204 is also coupled to the ground through the thermistor $R_{NTC}$ and the second matching resistor Ro, which are coupled in series with one another.

According to an embodiment, the LED current control unit 202 may be configured to receive a control target from the target generating unit 204, and based on the control target and the received detection result of the LED current detection unit 201 to determine an LED driving indication signal.

According to an embodiment, the LED driving unit 203 receives the output of the LED current control unit 202, e.g., the LED driving indication signal, and provides the LED driving signal that meets the target requirements to the LED.

Figure 3:
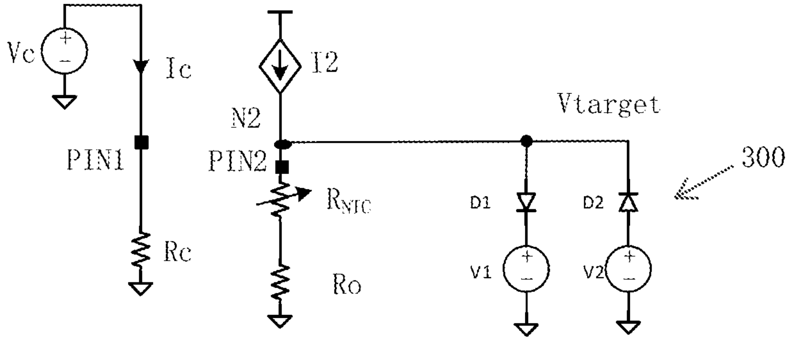
FIG. 3 is a schematic structural diagram of a target generation unit according to an embodiment of the present application.

FIG. 3 is a schematic structural diagram of a target generating unit according to an embodiment of the present application.

As shown, the target generating unit may include a voltage source Vc, one end of which is configured to receive ground potential and the other end coupled to a matching resistor Rc, configured to generate a current Ic across the resistor Rc.

According to an embodiment, the target generating unit 204 may further include a current-control current source I2 configured to generate a current I2 flowing through the thermistor $R_{NTC}$ and the matching resistor Ro. According to an embodiment, I2 is proportional to Ic, e.g., I2 may be equal to Ic.

According to an embodiment, the voltage drop Vtarget on the thermistor $R_{NTC}$ and the matching resistor Ro can be used as a control target for controlling the LED, in some embodiments, it is limited by a clamp circuit 300.

According to an embodiment, the target generating unit 204 may also include a voltage clamping circuit, such as two voltage clamping branches in parallel with the $R_{NTC}$ and Ro branches. The structure for voltage clamping may include various structures known in the art.

According to an embodiment, the first voltage clamping branch may include a voltage source V1 and a diode D1. One end of the voltage source V1 is configured to receive ground potential and the other end is coupled to the cathode of the diode D1, whose anode is coupled to a node PIN2 between the $R_{NTC}$ and the current controlled current source I2.

According to an embodiment, the second voltage clamping branch may include a voltage source V2 and a diode D2. One end of the voltage source V2 can be configured to receive ground potential and the other end is coupled to the anode of the diode D2. The cathode of diode D2 is coupled to the node N2 between the $R_{NTC}$ and the current-controlled current source I2. In some embodiments, as shown in FIG. 3, in an off-chip configuration, node N2 is between the current-controlled current source I2 and a pin PIN2, and the $R_{NTC}$ is coupled to the LED driver chip 200 through PIN2.

According to an embodiment, the voltage of V1 may correspond to the upper LED current limit ILED1, and the voltage of V2 may correspond to the lower LED current limit ILED2.

By selecting the matching resistors Rc and Ro according to the model of $R_{NTC}$, the LED current can be stabilized at LED1 when the temperature is lower than T1, and the LED current can be stabilized at LED2 when the temperature is higher than T2. In the interval from T1 to T2, the change slope of the LED current fits or is basically the same as the change slope of the $R_{NTC}$ over temperature.

According to an embodiment, ILED1 may be, for example, 100% of the maximum operating current of the LED, and ILED2 may be 50% of the maximum operating current the LED. Of course, different systems can define these two upper and lower limits variously as needed.

The calculation of the matching resistance of the thermistor will be described in detail herein.

Figure 4:
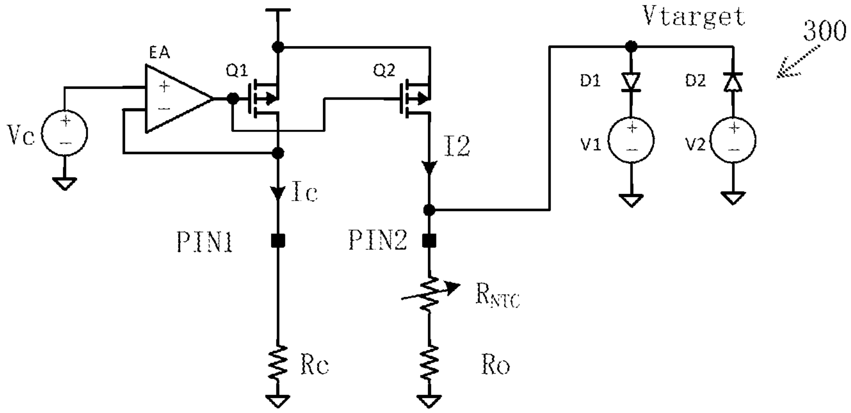
FIG. 4 is a schematic circuit diagram of a target generating unit according to an embodiment of the present application.

FIG. 4 is a schematic circuit diagram of a target generating unit 204 according to an embodiment of the present application. As shown in FIG. 4, the target generating unit 204 may include a voltage source Vc, an operational amplifier EA, a current mirror composed of transistors Q1 and Q2, and a voltage clamp circuit 300. According to an embodiment, the current-controlled current source I2 shown in FIG. 3 may include the operational amplifier EA and transistors Q1 and Q2.

According to an embodiment, the positive input terminal of EA may receive the current source voltage Vc, the output terminal may be coupled to the control terminal of transistor Q1, and the negative input terminal may be coupled to the second terminal of transistor Q1. A first terminal of transistor Q1 may be coupled to a power supply, and a second terminal may be coupled to the ground through resistor Rc. The control terminal of the transistor Q2 may be coupled to the control terminal of the transistor Q1, e.g., coupled to the output terminal of EA, the first terminal of the transistor Q2 may be coupled to the power supply, and the second terminal may be coupled to the ground through the thermistor $R_{NTC}$ and the resistor Ro, which are coupled in series to one another.

According to an embodiment, the first voltage clamping branch may include a diode D1 with its anode coupled to the second terminal of transistor Q2 and its cathode coupled to the ground through the voltage source V1.

According to an embodiment, the second voltage clamping branch may comprise a diode D2, the cathode of which is coupled to the second terminal of transistor Q2, and the anode of which is coupled to the ground through the voltage source V2.

According to an embodiment, the current through resistor Rc is Ic and the current through thermistor $R_{NTC}$ and the resistor Ro is I2.

According to an embodiment, the operational amplifier EA in steady state keeps its positive and negative input terminal voltages equal, therefore forming a reference current Ic across Rc. Through the mirror action of transistors Q1 and Q2, a current I2 proportional to the reference current Ic is generated. I2 flows through thermistor RNTC and resistor Ro, and the voltage drop Vtarget across thermistor RNTC and the resistor Ro is used as the LED control target. According to an embodiment, I2 is equal to Ic.

According to an embodiment, Vtarget is clamped between V1 and V2. When the temperature is lower than T1, Vtarget is kept at the level of V1; when the temperature is higher than T2, Vtarget is kept at the level of V2; when the temperature is between T1 and T2, Vtarget changes with the resistance value of RNTC. According to an embodiment, V1 may correspond to the maximum operating current of the LED, while V2 may be, for example, 50% of V1, or corresponding to 50% of the maximum operating current of the LED. It should be appreciated that the values of V1 and V2 and the corresponding relationship with the maximum operating current of the LED can be set according to the needs of the system.

According to an embodiment, when the user replaces a different type of RNTC, it is not necessary to replace the current sources V1 and V2. By adjusting the value of Rc, the slope of the change curve of the LED control target with temperature can be adjusted to make it as close as possible to the RNTC resistance. Also, by adjusting the value of Ro, the absolute level of the LED control target can vary, so that the LED currents corresponding to V1 and V2 coincide with ILED1 and ILED2.

A method for calculating the matching Rc and Ro based on RNTC is introduced herein.

$$R_{NTC}=Tc*T+R_{NTCo} \qquad \text{Equation (1)},$$

where Tc is the rate of change of the resistivity $R_{NTC}$ of the current NTC thermistor over temperature, Tc is a negative value; T is the temperature; $R_{NTCo}$ is the resistance value of the NTC thermistor at zero degrees; and $R_{NTC}$ is the resistance value of the NTC thermistor at the current temperature.

The reference current can be calculated by Equation (2)

$$Ic=Vc/Rc \qquad \text{Equation (2)}.$$

Based on the reference current, the current I2 flowing through the $R_{NTC}$ can be obtained through the current mirror, as shown in Equation (3)

$$I2=A*Ic \qquad \text{Equation (3)},$$

where A is the scale factor of the current mirror, which is a positive number, and A may be 1 according to an embodiment.

The control target Vtarget can be expressed by Equation (4)

$$Vtarget=I2*(RNTC+Ro) \qquad \text{Equation (4)}.$$

Therefore, Vtarget can be further expressed as $$Vtarget=A*Vc/Rc*(R_{NTC}+Ro) \qquad \text{Equation (5)},$$

$$Vtarget=A*Vc/Rc*[(Tc*T+R_{NTCo})+Ro] \qquad \text{Equation (6)},$$

$$Vtarget=A*Vc/Rc*Tc*T+A*Vc/Rc*(R_{NTCo}+Ro) \qquad \text{Equation (7)}.$$

If we substitute the following two equations into Equation (7), $$Vtarget(T1)=V1 \qquad \text{Equation (8)},$$

$$Vtarget(T2)=V2 \qquad \text{Equation (9)},$$

the following Equation (10) can be obtained, $$A*Vc/Rc*Tc=(V2-V1)/(T2-T1) \qquad \text{Equation (10)}.$$

Therefore, according to Equation (10), as well as the known T1 and T2, and V1 and V2 (the LED voltages corresponding to ILED1 and ILED2, respectively), and the current rate of change of the resistance value of the thermistor NTC with the temperature Tc, to calculate the current thermal sensitivity, the value of the first matching resistor Rc corresponding to the NTC thermistor can be obtained.

According to an embodiment, for example, the voltage V1 when the temperature is T1 can be selected to bring into Equation (6):

$$Vtarget(T1)=V1 \qquad \text{Equation (11)}.$$

And based on the value of Rc obtained by the above calculation, the matching resistance Ro can be calculated as shown in Equation (12):

$$Ro=V1-A*Vc/Rc*R_{NTC}(T1) \qquad \text{Equation (12)},$$

where $R_{NTC}(T1)=Tc*T1+R_{NTCo}$.

Figure 5:
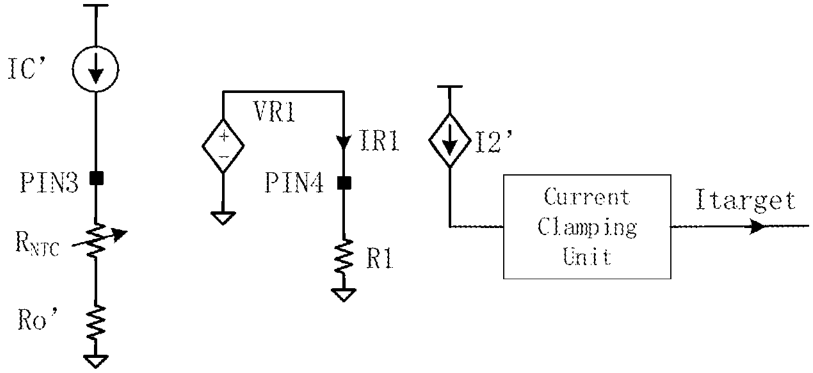
FIG. 5 is a schematic structural diagram of a target generation unit according to another embodiment of the present application.

FIG. 5 is a schematic structural diagram of a target generating unit according to another embodiment of the present application.

According to an embodiment, the target generating unit may include a current source Ic' configured to generate a voltage drop VPIN3, i.e., the voltage at the chip pin PIN3, across the thermistor $R_{NTC}$ and the matching resistor Ro' in series with it, in an example off-chip configuration where the thermistor $R_{NTC}$ and the matching resistor Ro' are arranged outside of the LED driver chip 200 and are coupled to the components within the LED driver chip 200 through the chip pin PIN3.

According to an embodiment, the target generating unit 204 may further include a current-controlled voltage source VR1 configured to generate a current IR1 on the matching resistor R1. According to an embodiment, the voltage of VR1 is proportional to the voltage of VPIN3, for example, the two may be equal, or VR1 is equal to a*VPIN3, and a is a positive number.

According to an embodiment, the target generating unit may further include a current control current source I2', the current of which may be proportional to IR1, for example, the two may be equal, or I2' is equal to b*IR1, and b is a positive number.

According to an embodiment, the target generating unit may further include a current clamping branch coupled to I2', configured to clamp the control target Itarget at the level of ILED1 when the temperature is lower than T1, and clamp the target Itarget when the temperature is higher than T2 Itarget at the level of ILED2. The structure for current clamping may include various structures known in the art.

Figure 6:
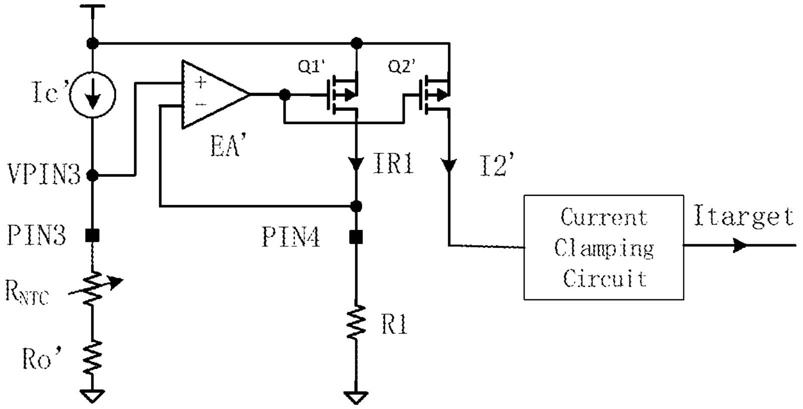
FIG. 6 is a schematic circuit diagram of a target generating unit according to another embodiment of the present application.

FIG. 6 is a schematic circuit diagram of a target generating unit according to an embodiment of the present application. As shown in the figure, the target generation unit may include a current source Ic', an operational amplifier EA', and a current mirror consisting of transistors Q1' and Q2', as well as a current clamping branch coupled to Q2'. According to an embodiment, the voltage-controlled voltage source IR1 and the current-controlled current source I2' shown in FIG. 6 may include an operational amplifier EA' thereof and transistors Q1' and Q2'.

According to an embodiment, one end of the current source Ic' is coupled to the power supply, and the other end is coupled to ground through a thermistor $R_{NTC}$ and a matching resistor Ro' that are coupled to one another in series.

According to an embodiment, the positive input of EA' may receive VPIN3 (i.e., the voltage drop across $R_{NTC}$ and Ro'), the output may be coupled to the control terminal of transistor Q1' and the control terminal of transistor Q2', and the negative input may be coupled to a second terminal of transistor Q1'. The second terminal is also coupled to the chip pin PIN4, in an example off-chip configuration where resistor R1 is arranged out of the LED driver chip 200 and is coupled to components within the chip through chip pin PIN4.

According to an embodiment, a first terminal of transistor Q1' is coupled to the power supply and the second terminal is coupled to the ground through a matching resistor R1.

According to an embodiment, the control terminal of transistor Q2' is coupled to the control terminal of transistor Q1', the first terminal of transistor Q2' is coupled to the power supply, and the second terminal is coupled to the current clamp circuit.

According to an embodiment, the current clamping circuit can adopt different structures existing in the art, and is used to stabilize the LED control target at ILED1 when the temperature is lower than T1, and stabilize the LED control target when the temperature is higher than T2 in ILED2.

According to an embodiment, the current flowing through the resistor R1 is IR1 and the current flowing through the resistors RNTC and Ro' is the current Ic' of the current source.

According to an embodiment, the operational amplifier EA' is so configured and coupled to maintain its positive and negative input voltages equal, that is, to maintain VPIN3 equal to VPIN4. Therefore, the voltage drop across matching resistor R1 is equal to VPIN3. Through the mirror action of transistors Q1' and Q2', the current IR1 flowing through the matching resistor R1 is proportionally mirrored to the second pole of transistor Q2' to form I2'. For example, I2' can be equal to IR1. I2' flows through the current clamp circuit and outputs the LED control target Itarget.

According to an embodiment, the current clamping circuit can adopt different structures in the art, and is used to make the LED target current Itarget ILED1 when the temperature is lower than T1, and make the LED target current ILED1 when the temperature is higher than T2. The current Itarget may be ILED2.

According to an embodiment, when the user replaces different types of thermistors, there is no need to change ILED1 and ILED2. By adjusting the value of R1, the slope of the curve of the LED control target with temperature changes can be adjusted to make it as close as possible to the current thermistor in the resistance changes with temperature. The slope of the curve is fitted; by adjusting the value of Ro', the height of the curve of the LED control target can be adjusted, so that the two threshold points of the curve of the LED control target corresponding to the temperatures T1 and T2 coincide with ILED1 and ILED2.

A method for calculating the matching R1 and Ro' based on RNTC is introduced in detail below.

Equation (13) shows that based on:

$$R_{NTC}=Tc*T+R_{NTCo} \quad \text{Equation (13),}$$

where Tc is the rate of change of the resistance of the current thermistor with temperature, Tc is a negative value; T is the current temperature; $R_{NTCo}$ is the resistance value of the current thermistor at zero degrees; $R_{NTC}$ is the resistance value of the thermistor at the current temperature.

The voltage drop across RNTC and Ro' can be expressed by Equation (14):

$$VPIN3=Ic'*(R_{NTC}+Ro') \quad \text{Equation (14).}$$

And because VPIN3 can be mirrored to VPIN4 using the operational amplifier EA', the Equation (15) is obtained $$VPIN4=VPIN3 \quad \text{Equation (15).}$$

The current flowing through the matching resistor R1 can be expressed by Equation (16):

$$IR1=VPIN4/R1=VPIN3/R1=Ic'*(R_{NTC}+Ro')/R1 \quad \text{Equation (16).}$$

Through the mirror relationship between transistors Q1' and Q2', IR1 can be mirrored to the second pole of Q2', and I2' can be expressed by Equation (17):

$$I2'=A*IR1=A*Ic'*(R_{NTC}+Ro')/R1 \quad \text{Equation (17),}$$

where A is the proportional relationship between IR1 and I2', and A can be a positive number.

At two temperature thresholds T1 and T2, the target current can be expressed as:

$$ILED1=I2'(T1) \quad \text{Equation (18)}$$

$$ILED2=I2'(T2) \quad \text{Equation (19).}$$

Substituting Equations (18) and (19) into Equation (17), respectively, can obtain Equation (20):

$$ILED2-ILED1=A*Ic'*(R_{NTC}(T2)-R_{NTC}(T1))/R1 \quad \text{Equation (20).}$$

Since ILED1, ILED2, Ic', $R_{NTC}$(T1), $R_{NTC}$(T2) and A are all known values, the value of matching resistor R1 can be calculated by Equation (20).

Equation (21) can be obtained by substituting the calculated matching resistance R1 and, for example, Equation (18) into Equation (17):

$$ILED1=A*(Ic'*(R_{NTC}(T1)+Ro')/R1 \quad \text{Equation (21).}$$

Since ILED1, Ic', $R_{NTC}$(T1) and A are all known values, the value of the matching resistor Ro' can be calculated by Equation (21), $R_{NTC}(T1)=Tc*T1+R_{NTCo}$.

In this application, the mentioned control target may be LED current or voltage, which correspond to different levels of LED brightness. Of course, the current signal and the voltage signal are interchangeable. Therefore, after obtaining a specific type of control target based on the solution of the present application, converting it into another form still falls within the scope of protection of the present application.

By using the method disclosed in the present application, it is not necessary to change the internal structure of the LED driver chip, nor to increase the design cost of the LED driver chip, and it is only implemented by adjusting the external resistor to match different models of thermistor. The thermistor realizes the LED control target curve fitted with the slope of its curve over temperature change, and ensures that the upper and lower limits of the LED control target meet the same upper and lower limit levels for different thermistors. The LED control system and method disclosed in the present application have a low cost and simple control process. Users can choose the matching resistors to the available NTC resistors using the same LED driver chip.

Although the present application has been described with reference to specific examples, which are intended to be exemplary only, and not to limit the present application, it is obvious to those of ordinary skill in the art that the disclosed embodiments may be changed, added, or deleted without departing from the spirit and scope of protection of this application.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary, to employ concepts of the various patents, applications and publications to provide yet further embodiments.

These and other changes can be made to the embodiments considering the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A light emitting diode (LED) control system, comprising:

a LED driver chip;

a thermistor outside of the LED driver chip and coupled in a second branch; and a first resistor coupled in a first branch, wherein:

a second current in the second branch is proportional to a first current in the first branch; and a LED control target signal is configured to be a voltage at a node in the second branch.

2. The system of claim 1, wherein:

the LED driver chip includes a target generating unit; and further comprising a second resistor on the second branch and coupled between the target generating unit and ground terminal, the second matching resistor coupled in series with the thermistor.

3. The system of claim 2, wherein the target generation unit includes:

a first voltage source coupled to a first terminal of the LED driver chip, the first resistor coupled between the first terminal and the ground terminal;

a first current-controlled current source coupled to a second terminal of the LED driver chip, the thermistor and the second resistor coupled in series between the second terminal and the ground terminal, a current of the first current-controlled current source being controlled by a current flowing through the first matching resistor; and a voltage clamping circuit configured to receive a voltage drop across the thermistor and the second resistor as the LED control target signal, and to clamp the LED control target signal to an upper limit when the voltage drop across the thermistor and the second matching resistor is above the upper limit, and to clamp the LED control target signal to a lower limit when the voltage drop across the thermistor and the second resistor is below the lower limit.

4. The system of claim 3, wherein the first current-controlled current source includes:

a first operational amplifier, a first input of the first operational amplifier coupled to the first voltage source;

a first transistor, a first terminal of the first transistor coupled to a power supply terminal, a control terminal of the first transistor coupled to an output terminal of the first operational amplifier, and a second terminal of the first transistor coupled to the first terminal of the LED driver chip and a second input of the first operational amplifier; and a second transistor, a first terminal and a control terminal of the second transistor coupled to the first terminal and the control terminal of the first transistor, respectively, and a second terminal of the second transistor coupled to the second terminal of the LED driver chip and to the voltage clamping circuit.

5. The system of claim 4, wherein:

the voltage clamping circuit comprises a first clamping branch and a second clamping branch coupled in parallel with each other between the second terminal of the LED driver chip and the ground terminal;

the first clamping branch includes a first diode and a second voltage source, an anode of the first diode coupled to the second terminal of the LED driver chip, and a cathode of the first diode coupled to the ground terminal through the second voltage source;

the second clamping branch includes a second diode and a third voltage source, a cathode of the second diode coupled to the second terminal of the LED driver chip, and an anode of the second diode coupled to the ground terminal through the third voltage source; and the second voltage source corresponds to the upper limit, and the third voltage source corresponds to the lower limit.

6. The system of claim 1, wherein the LED driver chip further comprises:

an LED current detection unit configured to detect a current flowing through the LED;

an LED current control unit, coupled to the LED current detection unit and the target generation unit, and configured to generate a control signal based on the LED control target signal and the current flowing through the LED; and an LED current driving unit configured to drive the LED according to the control signal.

7. A light emitting diode (LED) control system, comprising:

a LED driver chip;

a first resistor coupled in a first branch; and a thermistor outside of the LED driver chip and coupled in a second branch; and an operational amplifier including a first input terminal and a second input terminal, the operational amplifier configured such that in operation, a first voltage value at the first input terminal and a second voltage value at the second input terminal equal one another, wherein the first input terminal is coupled to receive a first voltage at a first node in the first branch and the second input terminal is coupled to receive a second voltage at a second node in the second branch.

8. The system of claim 7, wherein the target generation unit includes:

a first current source coupled to the second node, the second node coupled to a ground terminal through the thermistor and a second resistor in series;

a first voltage-controlled voltage source coupled to a the first node, the first node coupled to the ground terminal through the first resistor, wherein a voltage of the first voltage-controlled voltage source is controlled by the second voltage at the second node;

a second current-controlled current source controlled by a current flowing through the first resistor; and a current clamp circuit, coupled to the second current-control current source, the current clamp circuit configured to receive a current of the second current-control current source as a LED control target signal, and to clamp the LED control target signal between an upper limit and a lower limit.

9. The system of claim 8, wherein:

the first voltage-controlled voltage source includes a first transistor, a first terminal of the first transistor coupled to a power supply terminal, a control terminal of the first transistor coupled to an output terminal of the operational amplifier, and a second terminal of the first transistor coupled to the first node and a the first input terminal of the operational amplifier; and a second current-controlled voltage source includes a second transistor, a first terminal and a control terminal of the second transistor coupled to the first terminal and the control terminal of the first transistor, respectively, and a second terminal of the second transistor coupled to the current clamp circuit.

10. The system of claim 7, wherein the LED driver chip further comprises:

an LED current detection unit configured to detect a current flowing through the LED;

an LED current control unit, coupled to the LED current detection unit and configured to generate a control signal based on the LED control target signal and the current flowing through the LED; and an LED current driving unit configured to drive the LED according to the control signal.

11. A light emitting diode (LED) control system, comprising:

a LED driver chip;

a thermistor outside of the LED driver chip; and at least one resistor, wherein:

the LED driver chip includes a target generating unit;

the at least one resistor includes a first resistor on a first branch coupled between the target generating unit and a ground terminal, the thermistor coupled on a second branch between the target generating unit and the ground terminal; and the target generation unit includes:

a first voltage source coupled to a first terminal of the LED driver chip, the first resistor coupled between the first terminal and the ground terminal;

a first current-controlled current source coupled to a second terminal of the LED driver chip, a current of the first current-controlled current source configured to be controlled by a current flowing through the first resistor; and a voltage clamping circuit configured to receive a voltage drop based on the thermistor as an output signal, and to clamp the output signal to an upper limit when the voltage drop based on the thermistor is above the upper limit, and to clamp the output signal to a lower limit when the voltage drop based on the thermistor is below the lower limit.

12. The system of claim 11, wherein the at least one resistor includes a second resistor coupled on the second branch and in series with the thermistor between the target generating unit and the ground terminal.

13. The system of claim 12, wherein the voltage drop based on the thermistor is a voltage drop across the thermistor and the second resistor.

14. The system of claim 11, wherein the first current-controlled current source includes:

a first operational amplifier, a positive input of the first operational amplifier coupled to the first voltage source;

a first transistor, a first terminal of the first transistor configured to be coupled to a power supply, a control terminal of the first transistor coupled to an output terminal of the first operational amplifier, and a second terminal of the first transistor coupled to a first terminal of the LED driver chip and a negative input of the first operational amplifier; and a second transistor, a first terminal and a control terminal of the second transistor coupled to the first terminal and the control terminal of the first transistor, respectively, and a second terminal of the second transistor coupled to a second terminal of the LED driver chip and to the voltage clamping circuit.

15. The system of claim 11, wherein:

the voltage clamping circuit comprises a first clamping branch and a second clamping branch coupled in parallel with each other between the second terminal of the LED driver chip and a ground terminal;

the first clamping branch includes a first diode and a second voltage source, an anode of the first diode coupled to the second terminal of the LED driver chip, and a cathode of the first diode coupled to the ground terminal through the second voltage source;

the second clamping branch includes a second diode and a third voltage source, a cathode of the second diode coupled to the second terminal of the LED driver chip, and an anode of the second diode coupled to the ground terminal through the third voltage source; and the second voltage source corresponds to the upper limit, and the third voltage source corresponds to the lower limit.

16. The system of claim 11, wherein the LED driver chip further comprises:

an LED current detection unit configured to detect a current flowing through the LED;

an LED current control unit, coupled to the LED current detection unit and the target generation unit, and configured to generate a control signal based on the LED control target signal and the current flowing through the LED; and an LED current driving unit configured to drive the LED according to the control signal.

17. A light emitting diode (LED) control system, comprising:

a LED driver chip;

a thermistor outside of the LED driver chip; and at least one resistor, wherein:

the LED driver chip includes a target generating unit;

the at least one resistor includes a first resistor on a first branch coupled between the target generating unit and a ground terminal, the thermistor coupled on a second branch between the target generating unit and the ground terminal; and the target generation unit includes:

a first current source coupled to a first terminal of the LED driver chip, the first terminal coupled to the ground terminal through the thermistor;

a first voltage-controlled voltage source coupled to a second terminal of the LED driver chip, the second terminal coupled to the ground terminal through the first resistor, wherein a voltage of the first voltage-controlled voltage source is controlled by a voltage drop based on the thermistor;

a second current source controlled by a current flowing through the first resistor; and a clamp circuit, coupled to the first branch, the clamp circuit configured to receive a signal of the first branch as an LED control target signal, and to clamp the LED control target signal between an upper limit and a lower limit.

18. The system of claim 17, wherein:

the first voltage-controlled voltage source includes a first transistor, a first terminal of the first transistor coupled to a power supply terminal, a control terminal of the first transistor coupled to an output terminal of an operational amplifier, and a second terminal of the first transistor coupled to the second terminal of the LED driver chip and a first input terminal of the operational amplifier;

a second current-controlled voltage source includes a second transistor, a first terminal and a control terminal of the second transistor coupled to the first terminal and the control terminal of the first transistor, respectively, and a second terminal of the second transistor coupled to the clamp circuit; and a second input terminal of the operational amplifier is coupled to receive the voltage drop based on the thermistor.

19. The system of claim 17, wherein the LED driver chip further comprises:

an LED current detection unit configured to detect a current flowing through the LED;

an LED current control unit, coupled to the LED current detection unit and the target generation unit, and configured to generate a control signal based on the LED control target signal and the current flowing through the LED; and an LED current driving unit configured to drive the LED according to the control signal.

* * * * *